(12) United States Patent
Jährling et al.

(10) Patent No.: US 9,038,623 B2
(45) Date of Patent: May 26, 2015

(54) PULL-OUT GUIDE

(75) Inventors: Peter Jährling, Bünde (DE); Daniel Rehage, Bielefeld (DE); Daniel Reidt, Herford (DE); Timo Kaps, Werther (DE)

(73) Assignee: PAUL HETTICH GMBH & CO. KG, Kirchlengern (DE)

(*) Notice: Subject to any disclaimer, the term of this patent is extended or adjusted under 35 U.S.C. 154(b) by 353 days.

(21) Appl. No.: 13/643,765

(22) PCT Filed: May 24, 2011

(86) PCT No.: PCT/EP2011/058416
§ 371 (c)(1),
(2), (4) Date: Dec. 28, 2012

(87) PCT Pub. No.: WO2011/147805
PCT Pub. Date: Dec. 1, 2011

(65) Prior Publication Data
US 2013/0101240 A1  Apr. 25, 2013

(30) Foreign Application Priority Data

May 27, 2010 (DE) .......................... 10 2010 017 115

(51) Int. Cl.
*F24C 15/16* (2006.01)
*F16C 29/00* (2006.01)

(52) U.S. Cl.
CPC ............... *F16C 29/00* (2013.01); *F24C 15/168* (2013.01)

(58) Field of Classification Search
USPC ............. 126/339, 340; 384/7; 312/408, 334.1
See application file for complete search history.

(56) References Cited

U.S. PATENT DOCUMENTS

| | | | | |
|---|---|---|---|---|
| 2,899,255 | A | * | 8/1959 | Evans ........................... 312/274 |
| 4,194,793 | A | * | 3/1980 | Offermans ...................... 384/18 |
| 7,087,862 | B1 | * | 8/2006 | Shaffer et al. ................. 219/392 |
| 2007/0261694 | A1 | | 11/2007 | Le et al. |

FOREIGN PATENT DOCUMENTS

| | | |
|---|---|---|
| DE | 39 24 101 | 2/1991 |
| DE | 20 2004 005 475 | 8/2004 |
| DE | 20 2005 020 458 | 6/2007 |
| DE | 10 2007 015 247 | 10/2008 |
| DE | 20 2008 010 188 | 1/2010 |
| DE | 10 2009 009 124 | 4/2010 |
| EP | 0 626 143 | 11/1994 |
| EP | 1 014 004 | 6/2000 |
| EP | 2 042 812 | 4/2009 |
| WO | 2010/052165 | 5/2010 |

* cited by examiner

Primary Examiner — Avinash Savani
(74) Attorney, Agent, or Firm — Barnes & Thornburg LLP (57) ABSTRACT

A pull-out guide for a baking oven. The pull-out guide includes a guide rail fixed in a position and configured as a hollow profile. The pull-out guide further includes a running rail movably mounted on the guide rail, and a bar inserted is into the guide rail, at least in sections.

15 Claims, 15 Drawing Sheets

PULL-OUT GUIDE

CROSS-REFERENCE TO RELATED APPLICATION

This application is a national stage of International Application PCT/EP2011/058416, filed May 24, 2011, and claims benefit of and priority to German Patent Application No. 10 2010 017 115.8, filed May 27, 2010, the content of which Applications are incorporated by reference herein.

BACKGROUND AND SUMMARY

The present disclosure relates to a pull-out guide for a baking oven. The pull-out guide includes a guide rail fixed in position and at least one running rail mounted movably on the guide rail. The guide rail is designed as a hollow profile.

Pull-out guides for baking ovens are known that are mounted to a side grid by additional fastening elements. The fastening elements are fixed to a guide rail. Although a stable attachment of the pull-out guide to the side grid can be obtained by so doing, the fastening elements and the rails of the pull-out guide, however, have to be comparatively made of a solid and thick-walled material. Moreover, the energy consumption of the baking oven is increased due to the material being heated up when the oven is in use.

DE 20 2008 010 188 discloses a quick fastening element for mounting a pull-out guide to a side grid of a baking oven. Two quick fastening elements spaced apart from each other are attached to a rail of the pull-out guide. The rail between these quick fastening elements is arranged freely suspended with the possibility of sagging. The rail does not rest against the bar of the side grid. Similar quick fastening elements are also described in WO 2010/052165, DE 20 2005 020 458 and DE 20 2004 005 475. In the case of the pull-out guides of the previously known systems, it is therefore necessary to design the rails with a high inherent stability so that the corresponding loads during usage can be absorbed and transferred to the quick fastening elements or respectively to the side grids.

Embodiments of the present disclosure provide for a pull-out guide for a baking oven, the pull-out guide having high stability. Such embodiments also provide for lower material thickness.

Thus, the present disclosure provides for a pull-out guide for a baking oven. The pull-out guide includes a guide rail fixed in a position and configured as a hollow profile. The pull-out guide further includes a running rail movably mounted on the guide rail, and a bar is inserted into the guide rail, at least in sections. The guide rail is supported on the bar.

According to the present disclosure, in the guide rail of the pull-out guide a bar is led through the guide rail at least in sections. The guide rail is supported on the bar. This way, the guide rail can be formed to be especially thin-walled because mechanical loads can be transferred to the bar by the bearing of the running rail. The bar can thereby rest against the guide rail in a linear, striped or stripped shaped manner, or flat, in order to support the guide rail. The shape of the bar can thereby be adapted to the geometry of the guide rail.

According to an embodiment of the present disclosure, the guide rail is fixed to the bar by clamping or locking in place, thereby making a simple mounting of the guide rail and the pull-out guide possible, in accordance with the present disclosure.

The bar may, in accordance with the present disclosure, be a part of a side grid in a baking oven. Such a side grid is already present in most ovens, anyway, to be able to slidably position oven racks/shelves for carrying foodstuffs to be cooked within the interior chamber of the baking oven. One or more pull-out guides can then be mounted onto the side grid at differing heights of the side grid. The bar can, in accordance with the present disclosure, be designed as a solid profile for a stable supporting of both the oven rack/shelf for carrying foodstuffs to be cooked and the pull-out guide. The bar can, in accordance with the present disclosure, be designed as a hollow profile or other profile designs are also possible with the scope of the present disclosure. The bar can also be formed from a tube or a composite material in accordance with the present disclosure.

The guide rail may, in accordance with the present disclosure, be made from a piece of bent sheet metal. Here, the guide rail has a wall thickness of less than 1 mm, or, for example, a thickness between 0.3 mm to 0.8 mm.

According to an embodiment of the present disclosure, the guide rail may have two webs that are spaced apart from each other and between which webs a slot is formed through which a section of the bar can be led through. In this way, the guide rail can be slid or pivoted onto a bar in a simple manner, to be then locked in place or otherwise secured in the desired position. For stable support, one or more protruding webs can, in accordance with the present disclosure, be formed integral with the guide rail, the protruding webs partially enclosing the bar. The webs can thereby also rest against a bent over end section of the bar in order to be able to transfer a load in different directions to the bar. According to the present disclosure, the bar can have, at opposite sides, a bent over end section against which the webs of the guide rail then rest.

In order to enhance a tight fit, the webs can, according to the present disclosure, be made from bimetal that contracts under a preferred operating temperature in the baking oven and thus the webs engage firmly around the bar.

According to an alternative embodiment of the present disclosure, the guide rail is fixed to the bar by a retaining element. This way, the guide rail can be held captive on the bar.

The guide rail may include at least one running track for rolling elements. Thus, the guide rail may, according to the present disclosure, be supported on the bar in a region of the running track. A linear contact surface can thereby be formed on a side opposite the running surface.

According to the present disclosure, an arrangement may include a pull-out guide and a bar configured to be attached to a side grid for a baking oven. The guide rail may be supported on the bar at least in a central region, that is, between 30% and 70% of a length of the guide rail. That is so that a bending in the central region can be avoided when the guide rail is in use.

In an embodiment according to the present disclosure, the pull-out guide may be slid onto moldings in furniture or domestic appliances. For example, wooden battens or plastic mountings can serve to accommodate the pull-out guide and may protrude into the slot of the pull-out guide. In the case of cooling devices, such support elements can be formed integrally with the wall, and by so doing cold thermal bridges cannot form.

In accordance with the present disclosure, embodiments of the pull-out guide may be especially used in furniture or domestic appliances.

Other aspects of the present disclosure will become apparent from the following descriptions when considered in conjunction with the accompanying drawings.

DETAILED DESCRIPTION

A pull-out guide 1 comprises a guide rail 2 arranged in a stationary or fixed fashion and upon which guide rail 2 a running rail 3 is movably mounted. It is within the scope of the present disclosure to include a central rail between the guide rail 2 and the running rail 3, thus making the pull-out guide 1 fully extendable.

Figure 1:
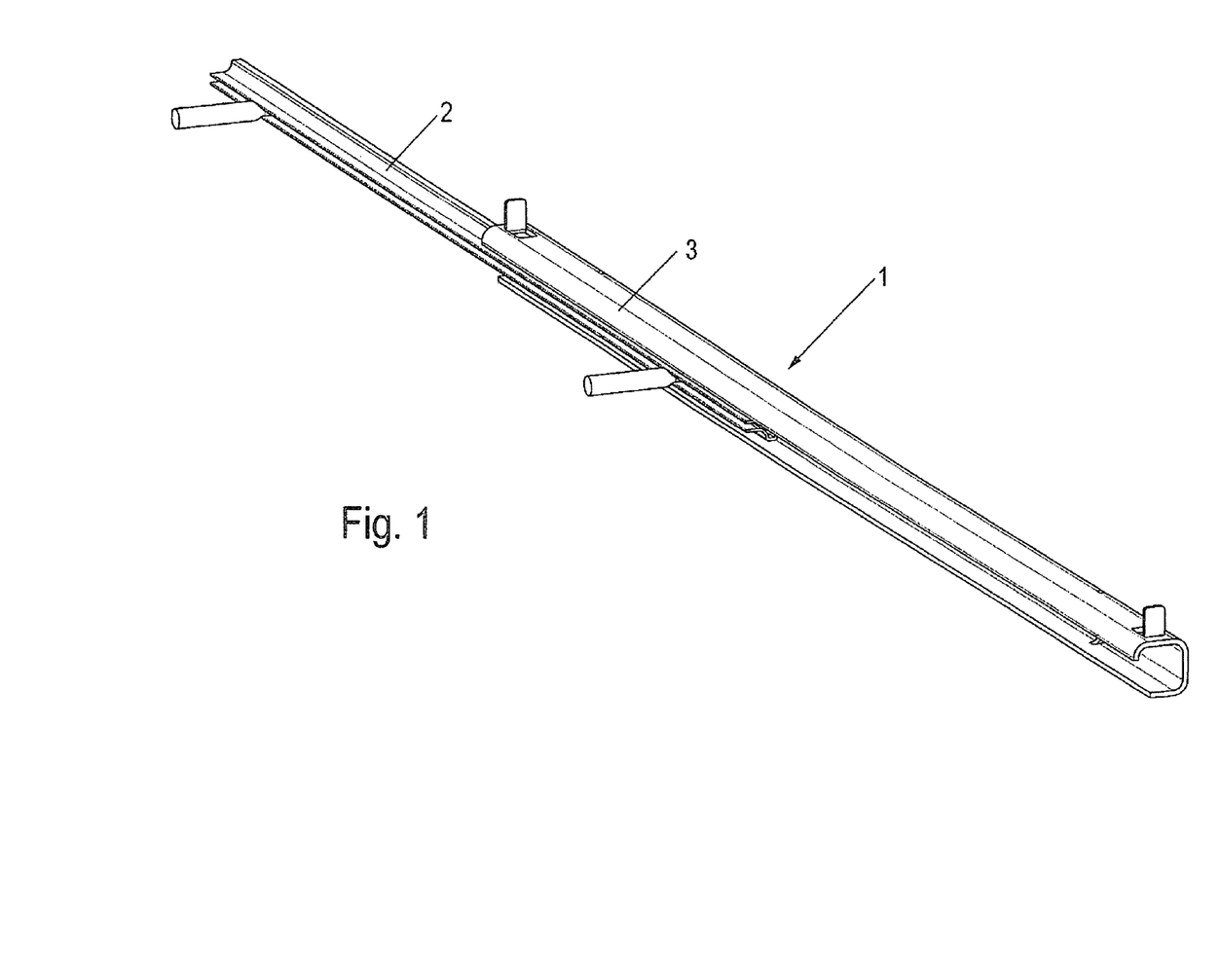
FIGS. 1 to 5 show a first embodiment of a pull-out guide, according to the present disclosure.
Figure 2:
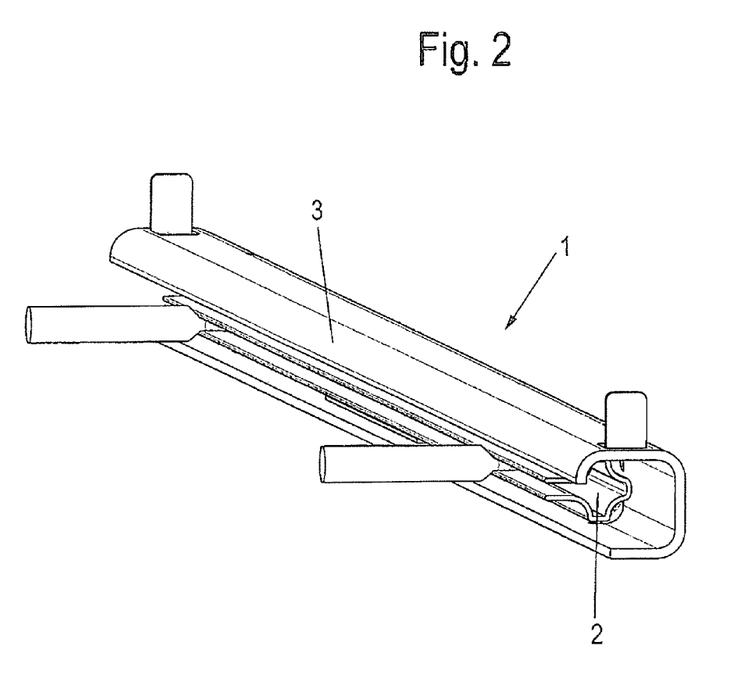
Figure 3:
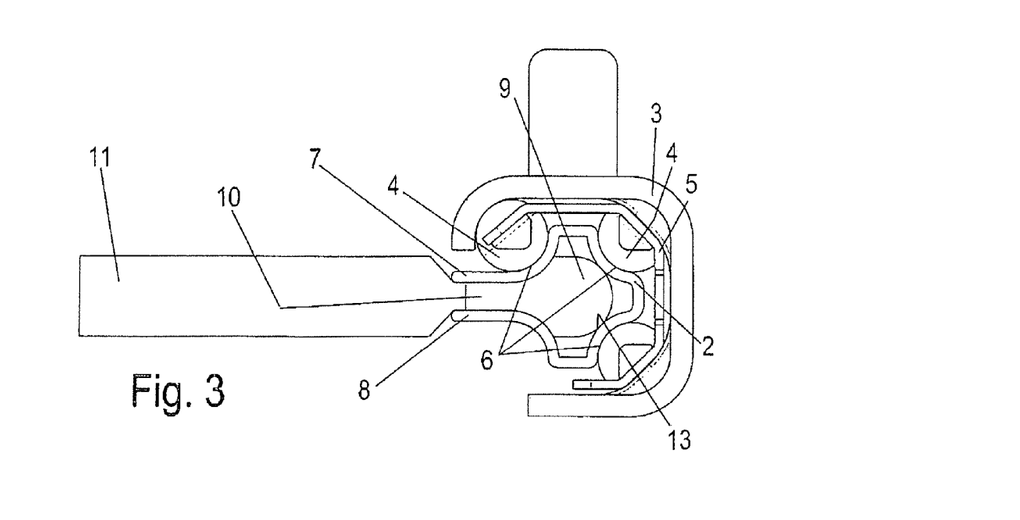
Figure 4:
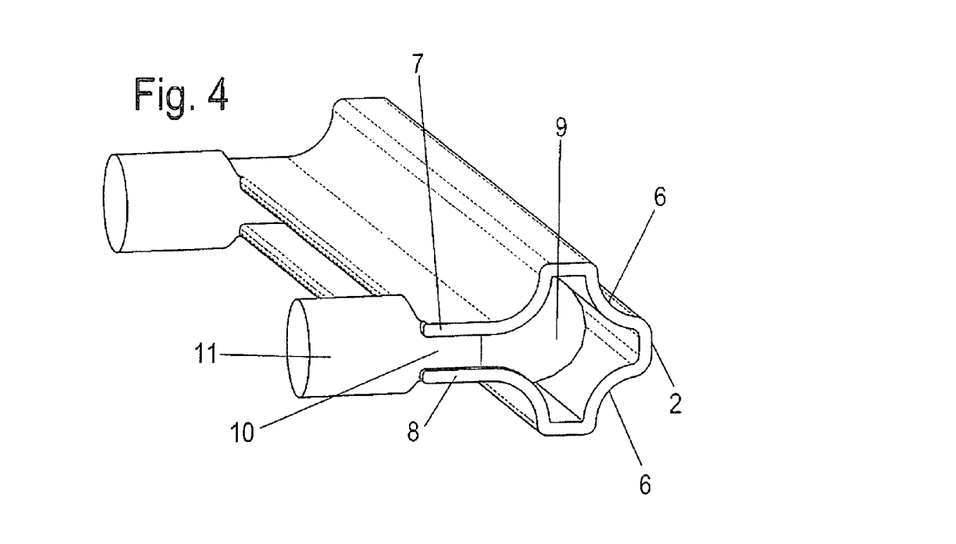

As can be seen in FIG. 3, arranged between the guide rail 2 and the running rail 3 are several rolling elements 4 that roll along running tracks 6 on the guide rail 2. Thereby, in a direction perpendicular to a longitudinal direction of the guide rail 2, there are, for example, three rolling elements 4 arranged on one plane and which rolling elements 4 are guided in a roller cage 5. The number of rolling elements 4 can, in accordance with the present disclosure, be selected depending on the anticipated loads.

The guide rail 2 may be manufactured from a piece of bent sheet metal and may have a hollow space or profile into which a bar 9 is inserted. The guide rail 2 includes, for example, two webs 7 and 8 between which a slot is formed and through which slot the bar 9 can be led through. The bar 9 is held at an angled end section 11 that has a tapered section 10 having lesser thickness against which the webs 7 and 8 of the guide rail 2 rest. Due to the tapered section 10, the guide rail 2 can be locked in place on the bar 9. By a force and/or a form fitting, the pull-out guide may be secured in the pull-out direction in order to prevent disengagement of the pull-out guide 1 during use.

The guide rail 2 may be made of a piece of thin-walled sheet metal which may, for example, have a thickness of between 0.3 mm and 0.8 mm. In order to be able to transfer the forces of the rolling elements 4 directly onto the bar 9, the guide rail 2 rests on the side facing away from the running tracks 6 at the bar 9 at a contact area or surface 13.

Figure 5:
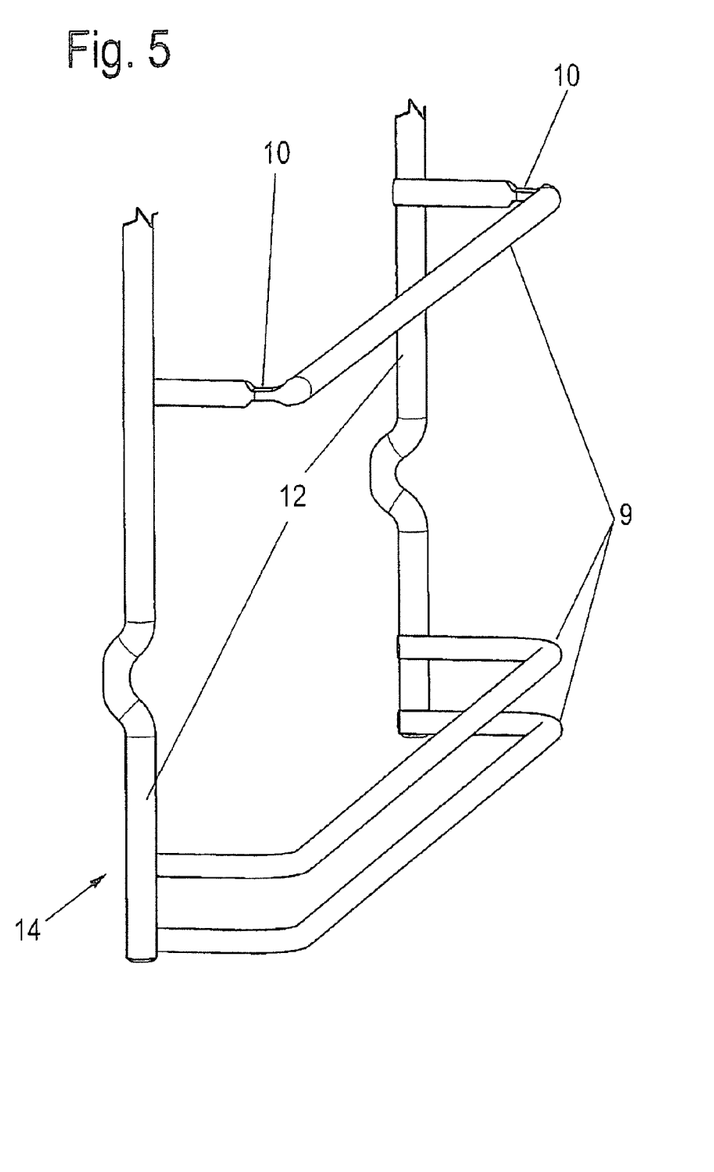
Figure 6:
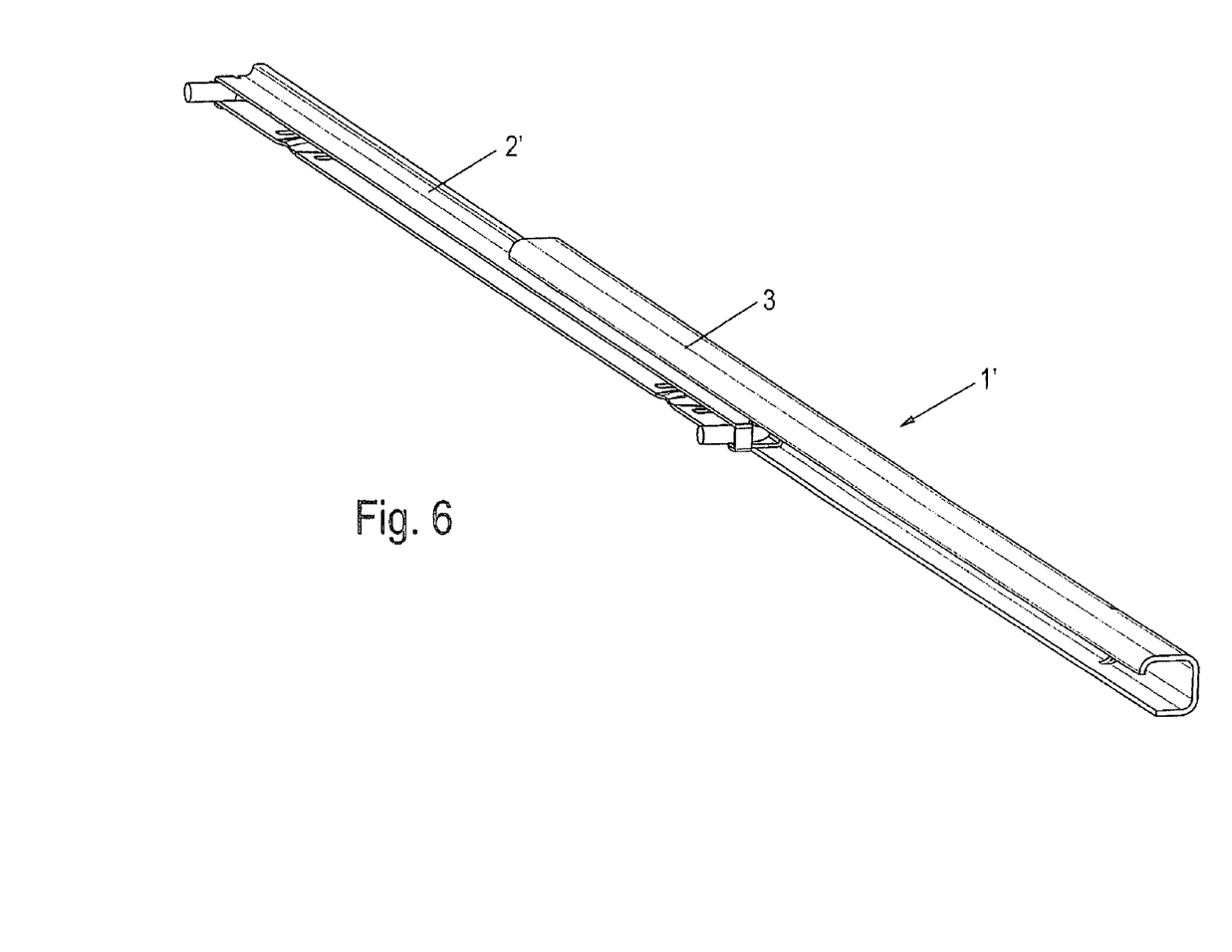
FIGS. 6 to 9 show a second embodiment of a pull-out guide, according to the present disclosure.
Figure 7:
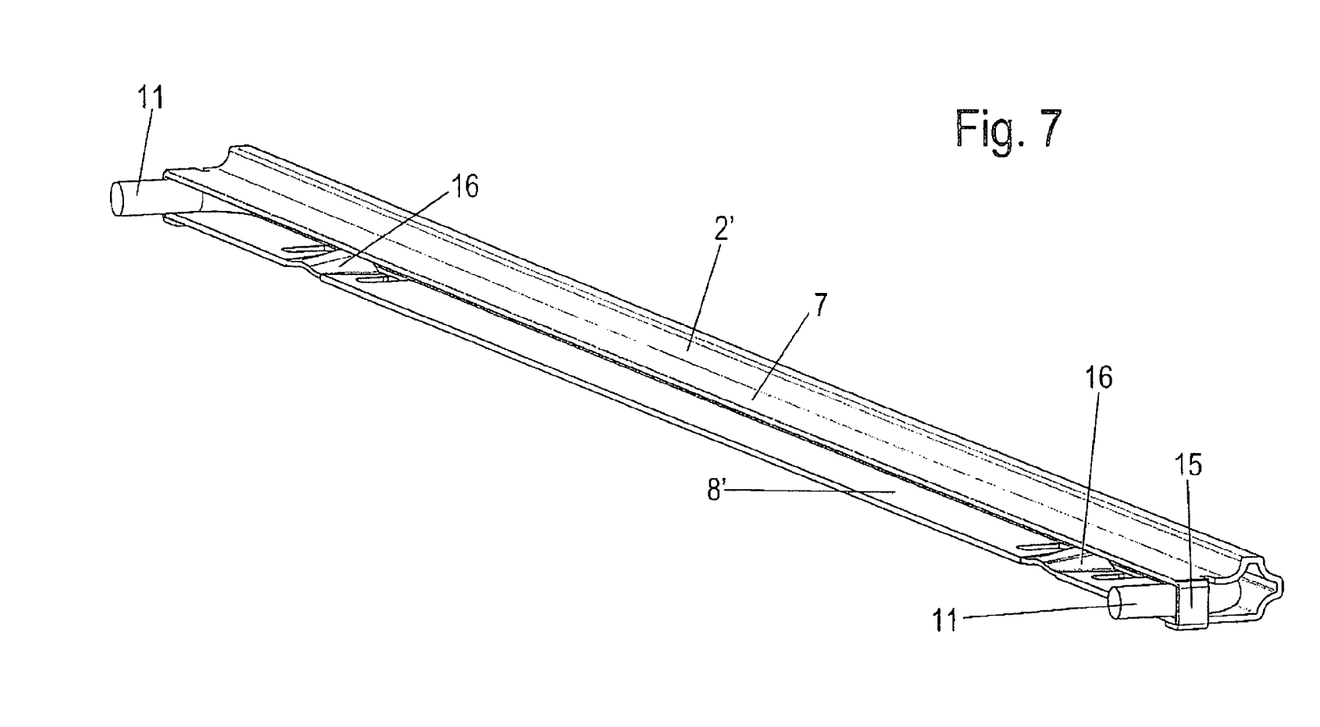
Figure 8:
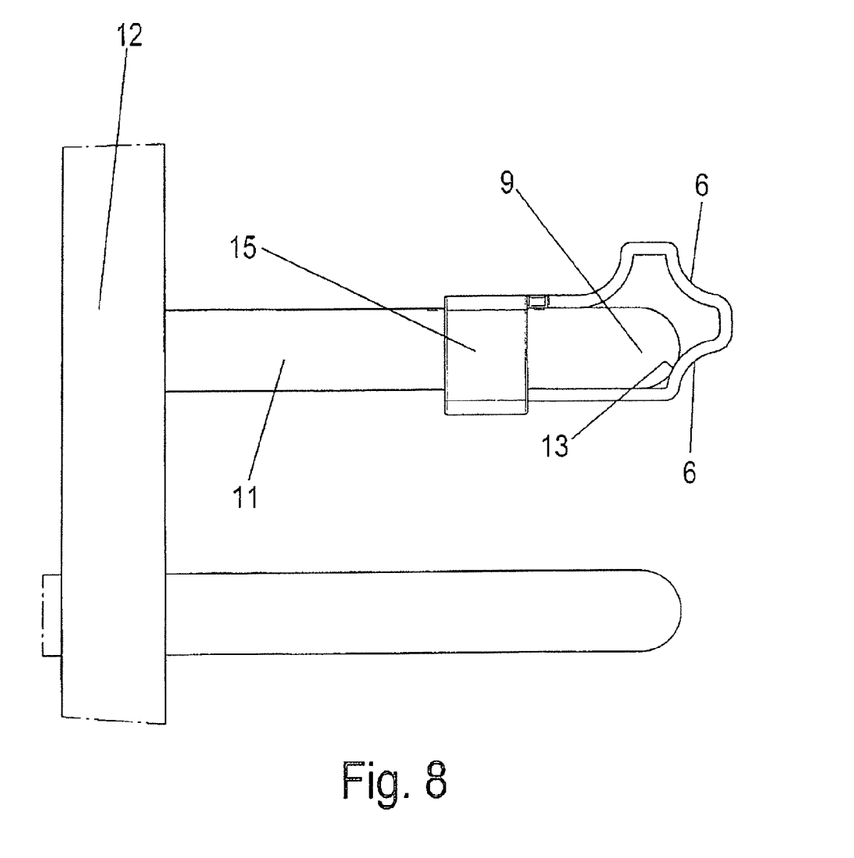
Figures 9, 10:
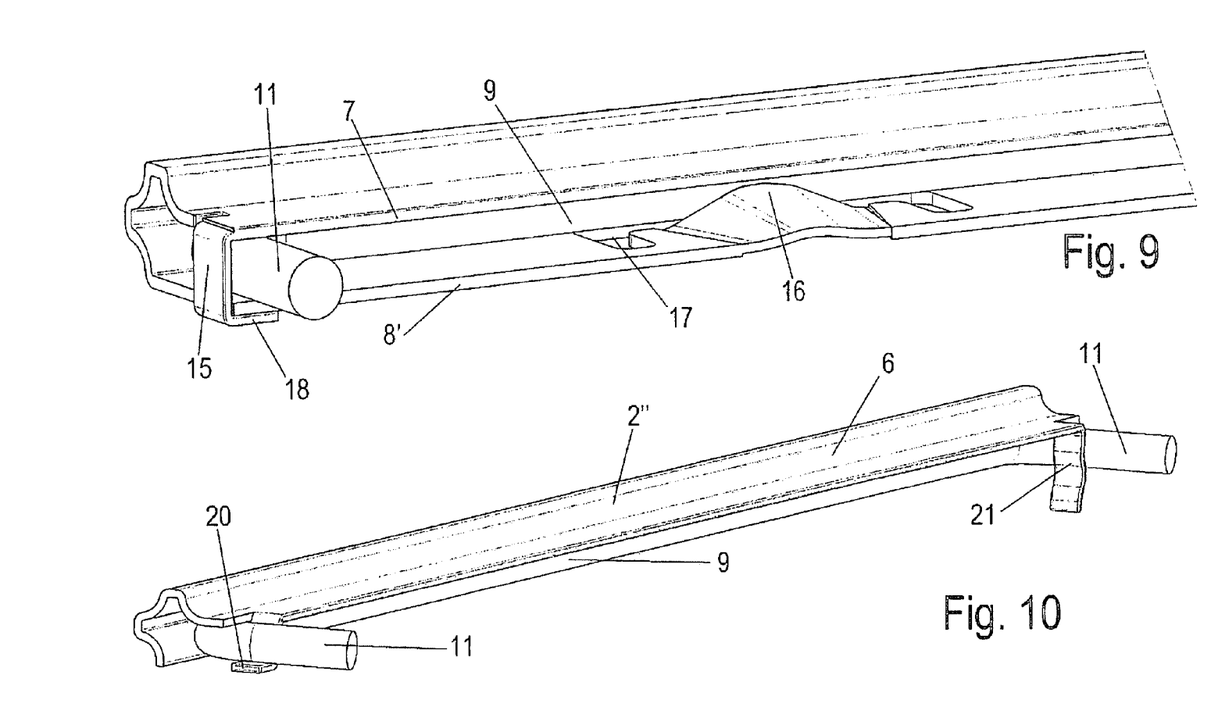
FIGS. 10 to 13 show a third embodiment of a pull-out guide, according to the present disclosure.
Figure 11:
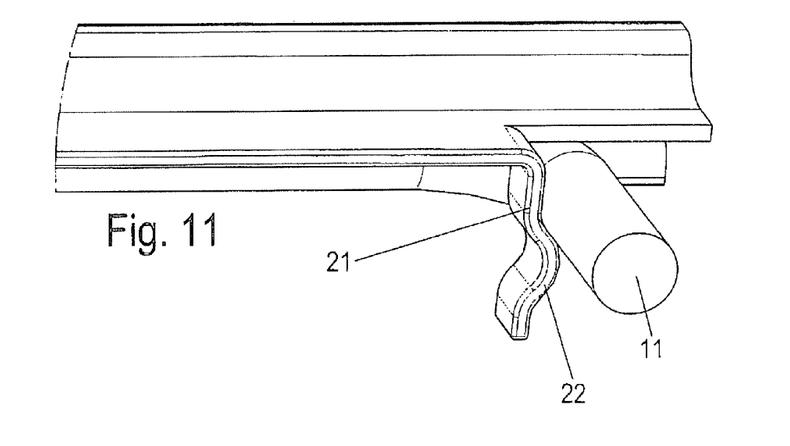
Figure 12:
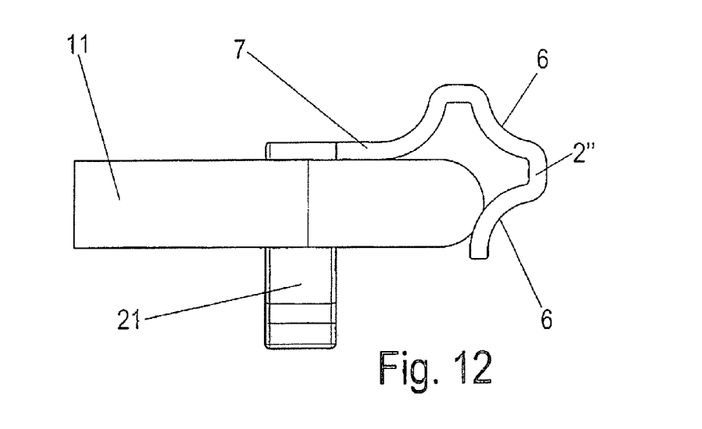
Figure 13:
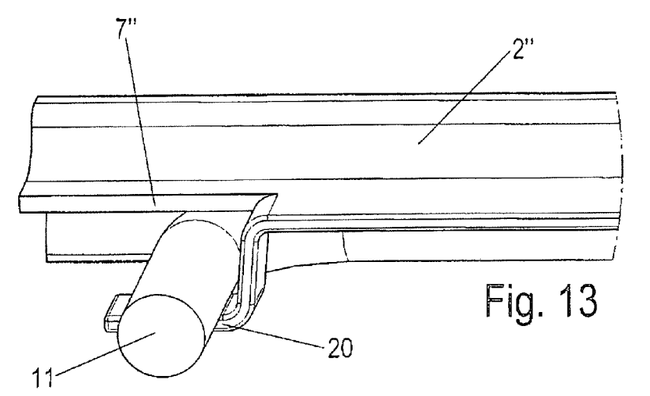

FIG. 5 shows a side grid 14 for attaching the pull-out guide 1. The side grid 14 may include multiple bars 9 that are connected to vertical posts 12 via angled end section 11. The attachment of the pull-out guide 1 can, for example, be carried out at bars 9 having tapered section 10, for example, the embodiment according to FIG. 1 to 4, or at bars 9 having a constant cross section, for example, the embodiments according to FIGS. 6 to 23.

In the following embodiments, components that are the same as in FIGS. 1-5 have the same drawing references in order to illustrate only modifications or differences from the embodiment of FIGS. 1-5.

FIGS. 6 to 9 show a second embodiment of a pull-out guide 1' according to the present disclosure. Pull-out guide 1' includes a stationary guide rail 2' and a movable running rail 3. The guide rail 2' includes an upper web 7 as well as a lower web 8' between which a slot is formed for leading the bar 9 through. Integrally formed on the lower web 8' are two profiles 16 spaced apart from each other that engage behind the bar 9. Each profile 16 juts out and projects upwards from the plane of the web 8' and is arranged adjacent to an opening 17. A front edge of the profile 16 rests thereby against a rear side of the bar 9 that on the opposite side abuts the rear of a running track 6 at a contact surface 13. Thus, the guide rail 2' is essentially locked in place by a form-fitting on the bar 9. In order to avoid a displacement of the guide rail 2' in the longitudinal direction, a U-shaped bracket 15, in the form of a web, is provided at the upper web 7, the U-shaped bracket 15 having a leg 18 that engages under the end section 11 of the bar 9. Likewise, there is a bracket 15 provided on the opposite side so that the guide rail 2' is held securely in each direction on the bar 9.

In FIGS. 10 to 13, another embodiment of a pull-out guide, a guide rail 2" is shown, which, together with a running rail 3, according to the preceding embodiments of the present disclosure, is configured to form a pull-out guide. The guide rail 2" may be formed from a piece of bent sheet metal, into the hollow space of which guide rail 2" a bar 9 is inserted. To fix the guide rail 2" onto the bar 9, an upper web 7 is, at an end side, provided with an L-shaped leg 20 that engages around an end section 11 of the bar 9. In this embodiment according to the present disclosure, the lower web 8 is dispensed with, thus obtaining an especially material-saving version of a guide rail 2". The guide rail 2" is thereby fixed via the L-shaped web 20 and, on the opposite side, via a catch web 21 abutting the inner side of bent over end section 11 of the bar 9 and can be locked in place on the bent over end section 11 by a catch hump 22 on the catch web 21. Mounting onto the side grid 14 can take place by pivoting around the central axis of the end section 11 after the web 20 is pushed under the end section 11.

Figure 14:
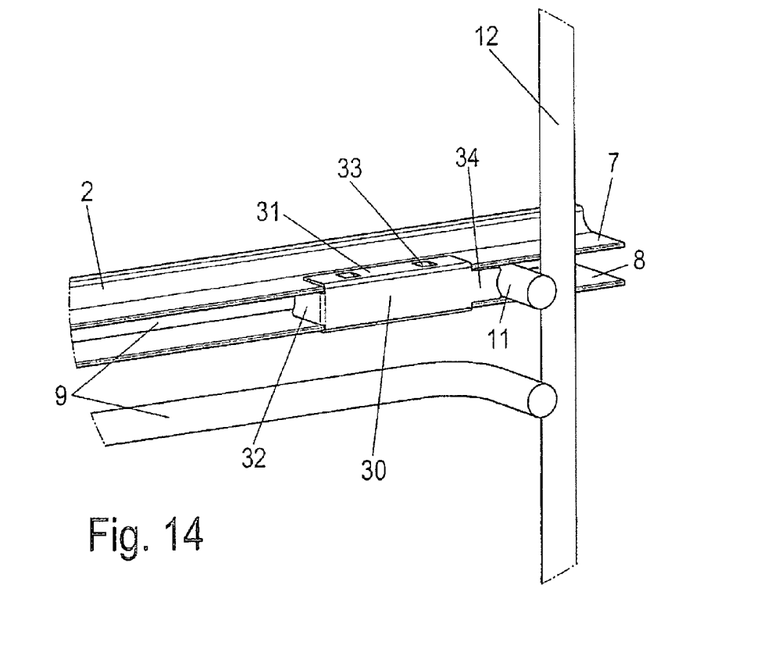
FIGS. 14 to 16 show a fourth embodiment of a pull-out guide, according to the present disclosure.
Figure 15:
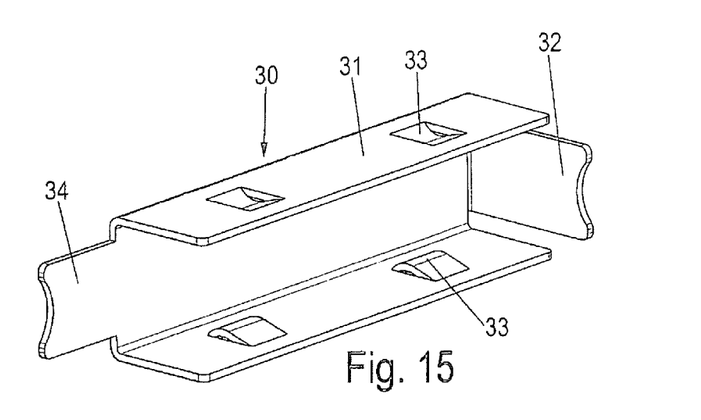
Figure 16:
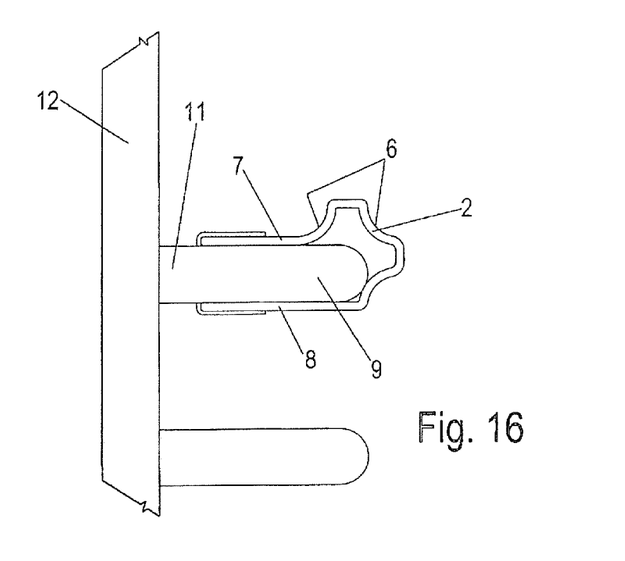

In another embodiment according to the present disclosure, another type of fastening for a guide rail 2 of a pull-out guide is depicted in FIGS. 14 to 16. The guide rail 2 is, as is illustrated in the embodiment depicted in FIG. 1, made from a piece of bent sheet metal including two webs 7 and 8, between which webs 7, 8 the bar 9 can be led through. In order to fix the guide rail 2 to the bar 9, a retaining element 30 is provided. The retaining element 30 includes a U-shaped body with two legs 31 that rest against the outer sides of the webs 7 and 8. On each leg 31, profiles 33 are provided that lie against the webs 7 and 8 or can be embossed with them. In order to keep the webs 7 and 8 spaced apart from each other and to fix the guide rail 2 securely to the bar 9 of the side grid 14, a web 32 is formed on the retaining element 30, the web 32 engaging between the webs 7 and 8. Furthermore, the retaining element 30 includes a protrusion 34 that rests on angled end section 11 of the bar 9. This allows for the guide rail 2 to be securely fixed on the bar 9 of the side grid 14 by the retaining element 30.

Figure 17:
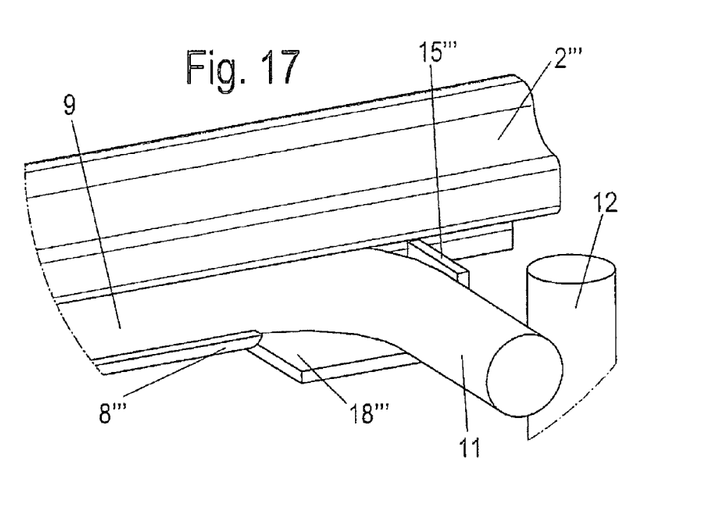
FIGS. 17 and 18 show a fifth embodiment of a pull-out guide, according to the present disclosure.
Figure 18:
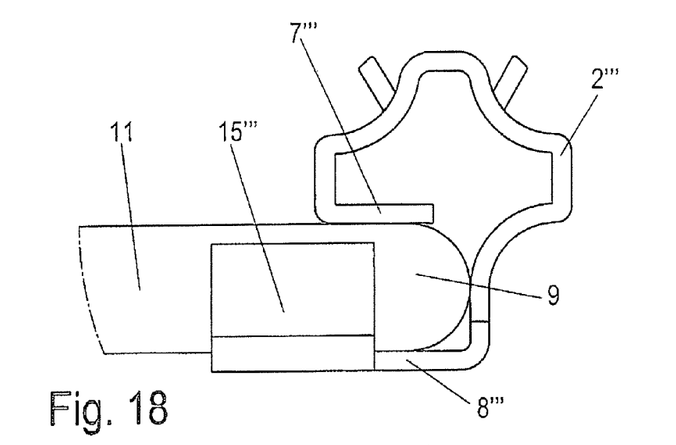

In FIGS. 17 and 18, a further embodiment of a guide rail 2''', according to the present disclosure, is depicted. An upper web 7''' is not angled outwards thereby making the end of the guide rail 2''' protrude rather inwards so that the end of the web 7''' projects into the hollow space of the guide rail 2'''. This way, the web 7' rests upon an upper surface of the bar 9. A lower web 8''' of the guide rail 2''' engages under the bar 9. Moreover, integrally formed brackets 15''' are provided on the web 8''' on opposite sides. The brackets 15''', which include a lower supporting surface 18''', rest against the underside of the bar 9 as well as against the angled end section 11. Adjacent to the bracket 15''' in the region of the bar 9, the web 8''' is bent slightly upwards in sections multiple times, thus engaging behind the bar 9 and enabling the guide rail 2''' to be locked in place on the bar 9.

In FIGS. 19 to 22, a further embodiment of a pull-out guide 1'''', according to the present disclosure, is shown having a movably supported running rail 3'''' that is movably supported on a guide rail 2'''' by rolling elements 4. The running rail 3'''' has a cross-section having a substantially C-shaped contour. The rolling elements 4 are arranged such that a row of rolling elements 4 are above the bar 9, a row of rolling elements 4 are below the bar 9, as well as a row of rolling elements 4 arranged horizontally on the side of the bar 9. The guide rail 2'''' is thereby arranged so that the running tracks 6 for the rolling elements 4 are formed in a bent shape and, by a linear contact surface 13, are supported on the bar 9. The contact surfaces 13'''' are arranged on the upper side, the lower side, and a horizontal side surface of the bar 9. The rolling elements 4 are guided in a roller cage 5''''. To limit the travel path, the pull-out guide 1'''' features a stop 19 for the roller cage 5'''' for the rolling elements 4.

In order to fix the guide rail 2'''' to the bar 9, there are, on the guide rail 2'''', integrally formed lugs 15'''' that rest against an angled end section 11 of the bar 9. This thus prevents the guide rail 2'''' from being longitudinally displaced relative to the bar 9. Further, the webs 7'''' and 8'''' of the guide rail 2'''' can be fixed by clamping to the bar 9, respectively to the angled end section 11.

Figure 19:
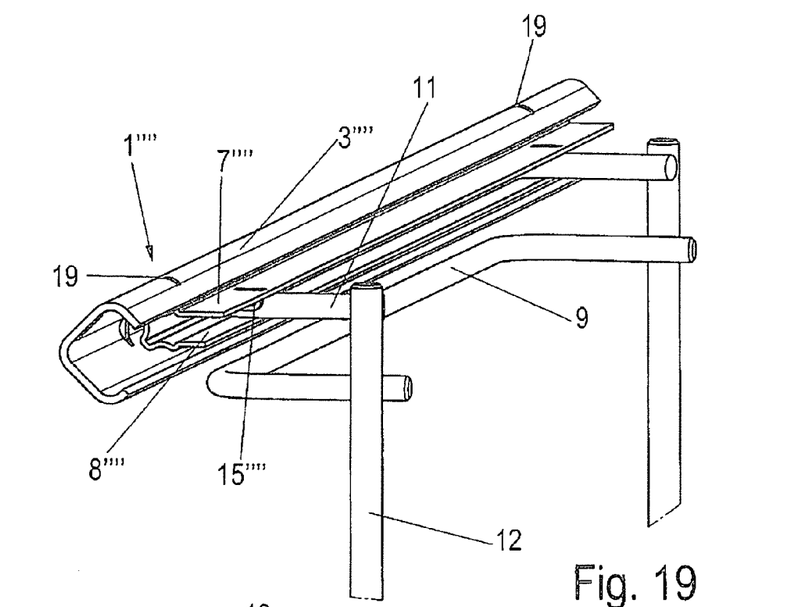
FIGS. 19 to 22 show a sixth embodiment of a pull-out guide, according to the present disclosure.
Figure 20:
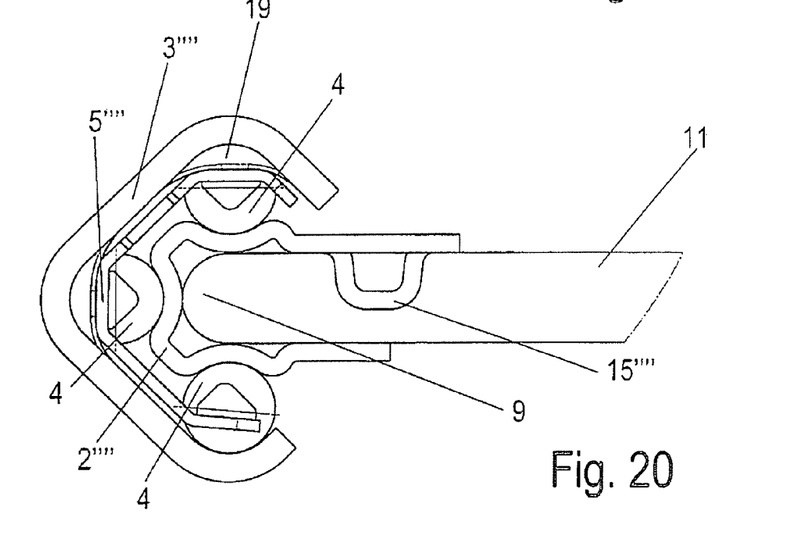
Figure 21:
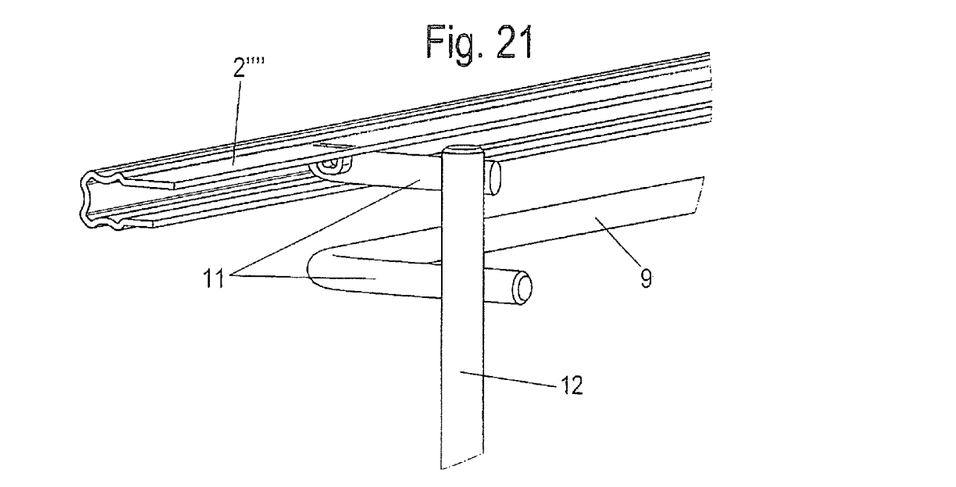
Figure 22:
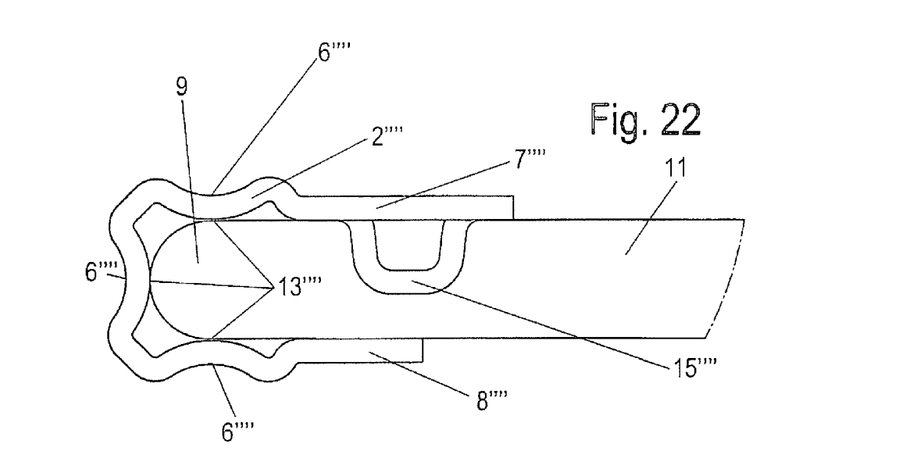
Figure 23:
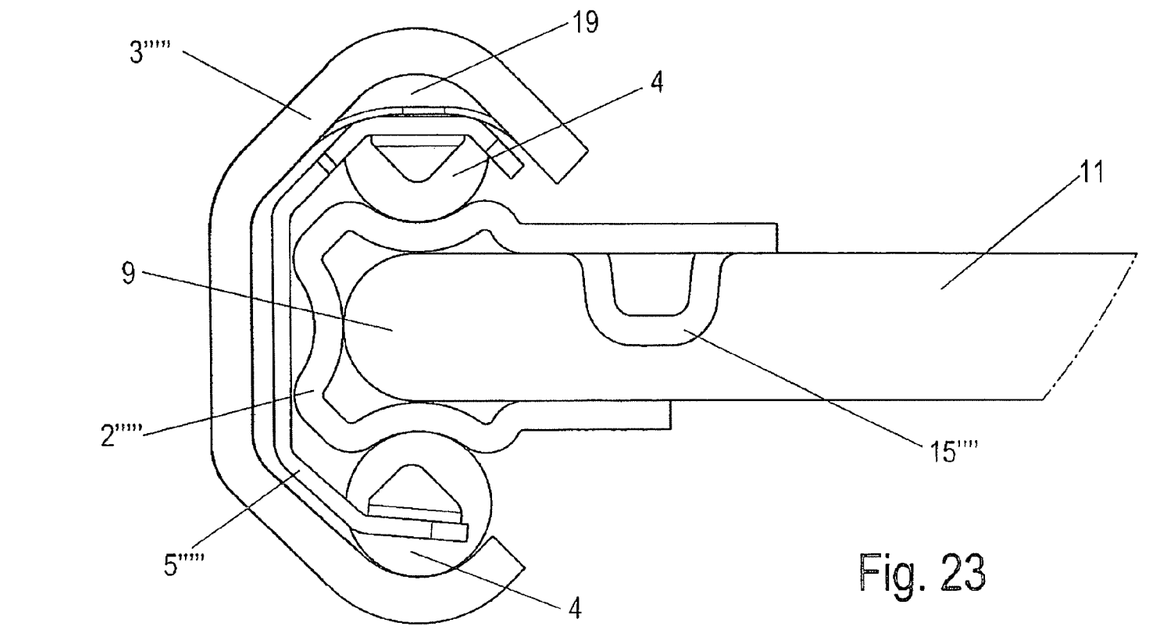
FIG. 23 shows a seventh embodiment of a pull-out guide, according to the present disclosure.

In FIG. 23, a further embodiment of a pull-out guide 1''''', according to the present disclosure, is shown having a movably supported running rail 3''''' that is movably supported on a guide rail 2''''' by rolling elements 4. The running rail 3''''' has a cross-section having a substantially C-shaped contour, wherein the rolling elements 4 are arranged such that a row of rolling elements 4 are above the bar 9 and a row of rolling elements 4 are below the bar 9, and only two rows of rolling elements 4 are provided. The guide rail 2''''' is thereby arranged so that the running tracks 6 for the rolling elements 4 are formed in a bent shape and, by a linear contact surface 13, are supported on the bar 9. The contact surfaces 13''''' are arranged on the upper side, the lower side, and a horizontal side surface of the bar 9. The rolling elements 4 are guided in a roller cage 5'''''. To limit the travel path, the pull-out guide 1'''' features a stop 19 for the roller cage 5''''', respectively for the rolling elements 4. The mounting of the pull-out guide 1''''' is carried out as shown in FIG. 19.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A pull-out guide and a bar, configured to be attached to the side grid of a baking oven, the pull-out guide comprising:
   a guide rail fixed in a position and configured as a hollow profile;
   a running rail movably mounted on the guide rail;
   the bar inserted into the guide rail, at least in sections; and
   the guide rail being supported on the bar.

2. The pull-out guide according to claim 1, wherein the guide rail is attached to the bar.

3. The pull-out guide according to claim 1, wherein the bar is part of the side grid.

4. The pull-out guide according to claim 1, wherein the bar is configured as a solid profile.

5. The pull-out guide according to claim 1, wherein the guide rail is manufactured from a piece of bent sheet metal.

6. The pull-out guide according to claim 1, wherein the guide rail has a thickness of less than 1 mm.

7. The pull-out guide according to claim 1, wherein the guide rail has a thickness of between 0.3 mm to 0.8 mm.

8. The pull-out guide according to claim 1, wherein the guide rail includes two webs spaced apart from each other, and between which webs a slot is formed through which a section of the bar is configured to be fed through.

9. The pull-out guide according to claim 1, wherein at least one protruding web is formed integrally with the guide rail and partially engages around the bar.

10. The pull-out guide according to claim 1, wherein the bar includes a bent over end section at which bent over end section the guide rail is supported.

11. The pull-out guide according to claim 1, wherein the bar includes a bent over end section on opposite sides of the bar on which bent over end sections the guide rail is supported in a longitudinal direction.

12. The pull-out guide according to claim 1, wherein the guide rail is attached to the bar by a retaining element.

13. The pull-out guide according to claim 1, wherein the guide rail forms at least one running track configured to accommodate a rolling element.

14. The pull-out guide according to claim 13, wherein the guide rail is supported on the bar in a region of the at least one running track.

15. The pull-out guide according to claim 2, wherein the bar is attached in one of a clamped and locked-in-place manner.

* * * * *